(12) United States Patent
Barrett et al.

(10) Patent No.: US 6,593,853 B1
(45) Date of Patent: Jul. 15, 2003

(54) RFID LABEL PRINTING SYSTEM

(75) Inventors: Tony J. Barrett, Milwaukee, WI (US); Charles J. Check, Mequon, WI (US); Craig A. Mauch, Glendale, WI (US); Michele Lauria, Brampton (CA); Peter G. Scharpf, Hartford, WI (US)

(73) Assignee: Brady Worldwide, Inc., Milwaukee, WI (US)

( * ) Notice: Subject to any disclaimer, the term of this patent is extended or adjusted under 35 U.S.C. 154(b) by 0 days.

(21) Appl. No.: 09/507,419

(22) Filed: Feb. 18, 2000

(51) Int. Cl.[7] ............................................. G08B 13/14
(52) U.S. Cl. ................. 340/572.1; 340/572.4; 340/572.6; 340/572.7; 340/825.69; 340/825.72
(58) Field of Search .................... 340/572.1, 572.4, 340/572.7, 825.72, 825.69, 572.6

(56) References Cited

U.S. PATENT DOCUMENTS

| | | | |
|---|---|---|---|
| 5,557,092 A | * 9/1996 | Ackley et al. | 235/462 |
| 5,619,416 A | * 4/1997 | Kosarew | 364/478.13 |
| 5,697,061 A | 12/1997 | Krueger et al. | 455/39 |
| 5,769,457 A | 6/1998 | Warther | 283/61 |
| 5,838,253 A | * 11/1998 | Wurz et al. | 340/825.54 |
| 5,841,365 A | 11/1998 | Rimkus | 340/825.35 |
| 6,130,613 A | * 10/2000 | Eberhardt et al. | 340/572.7 |

OTHER PUBLICATIONS

Texas Instruments, Press Release, "TIRIS Tag–It Adopted by Leading Printer and Label Companies for Smart Label Applications" Sep. 14, 1998.
Zebra Technologies, Press Release, "Zebra Technologies Introduces RFID Printer/Encoder" Oct. 5, 1999.

* cited by examiner

*Primary Examiner*—Benjamin C. Lee
*Assistant Examiner*—Hung Nguyen
(74) *Attorney, Agent, or Firm*—Quarles & Brady LLP

(57) ABSTRACT

A radio frequency identification device (RFID) label printing system which includes a printer for printing on a label having RFID circuitry. The printer includes a label exit for expelling a printed label, and an external programming module disposed adjacent the label exit for encoding the label expelled from said label exit. The external programming module can include a label marking mechanism which selectively marks a label to indicate a defective label to a user. A host computer communicatively connected to the printer and the external programming module coordinates the operation of the printer and the external programming module.

38 Claims, 15 Drawing Sheets

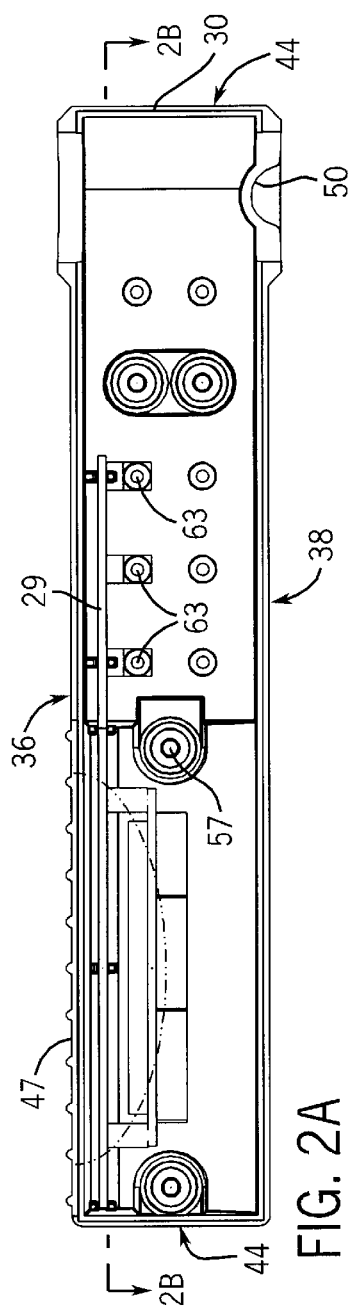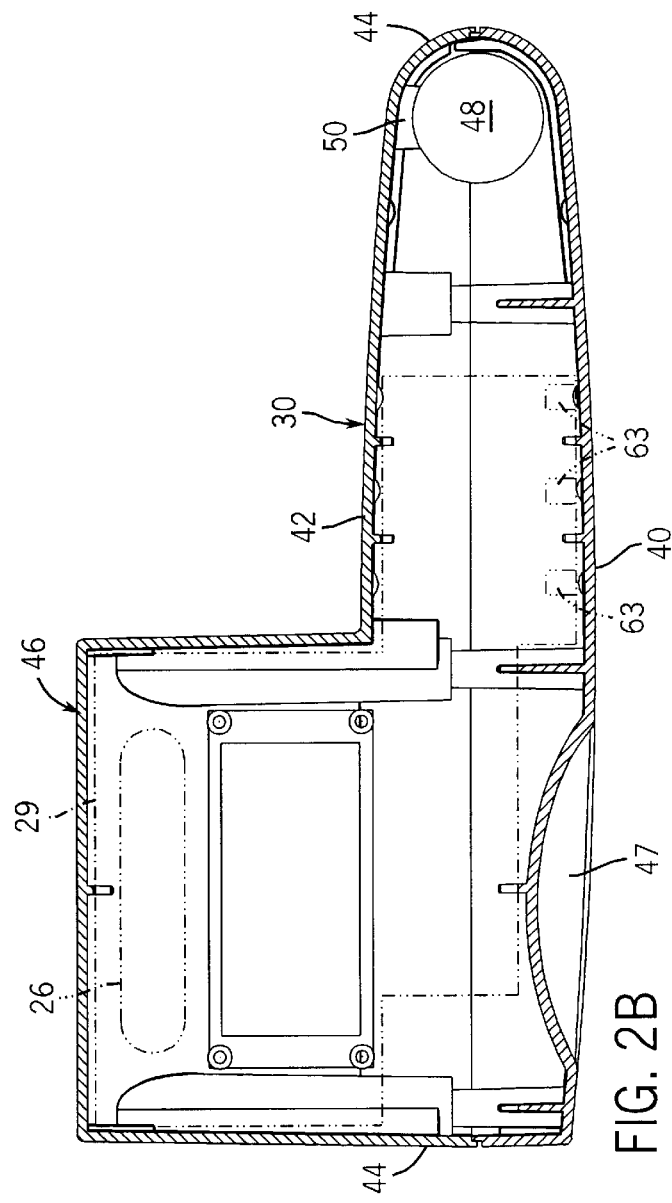

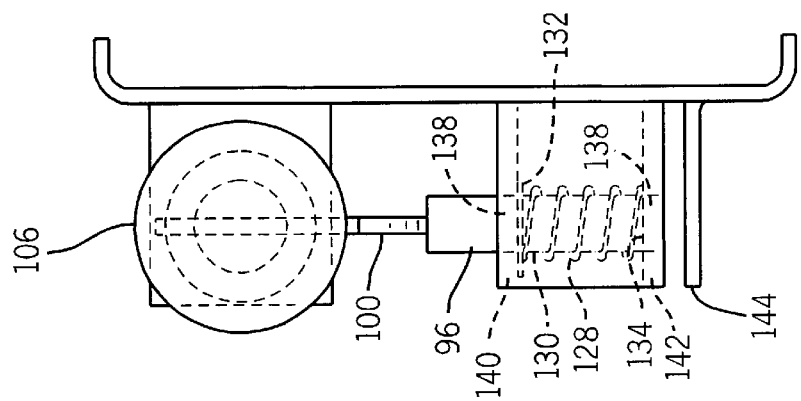
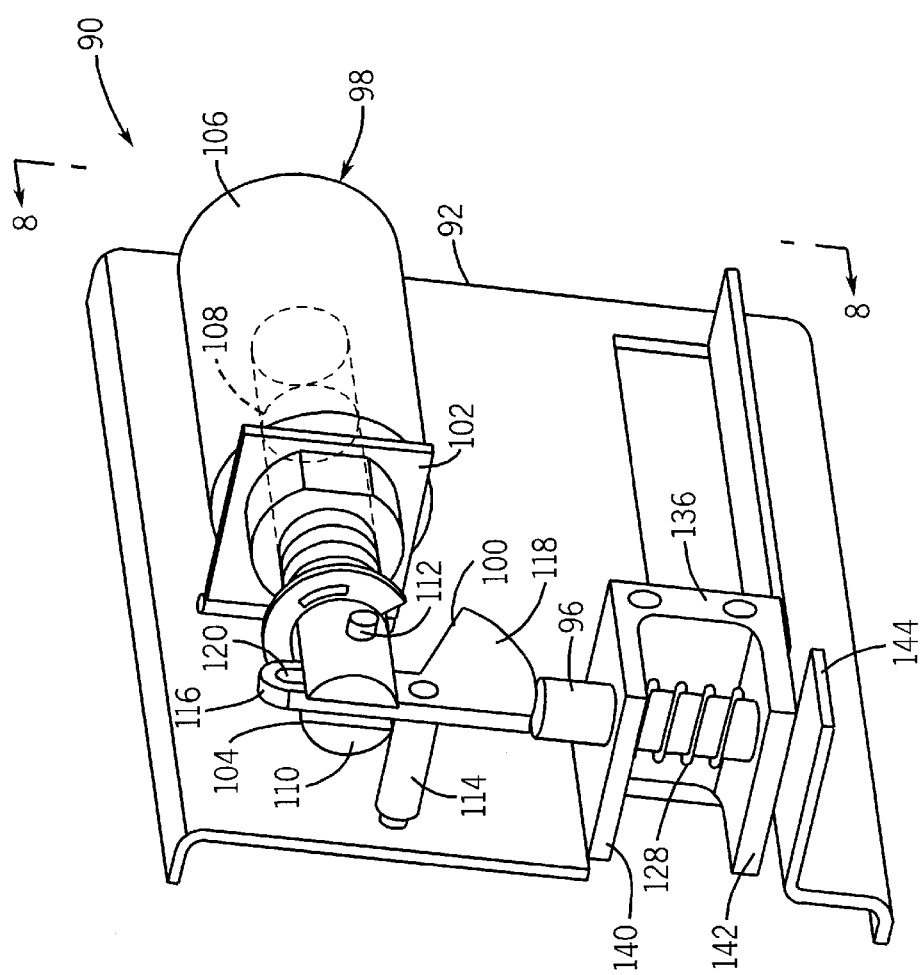

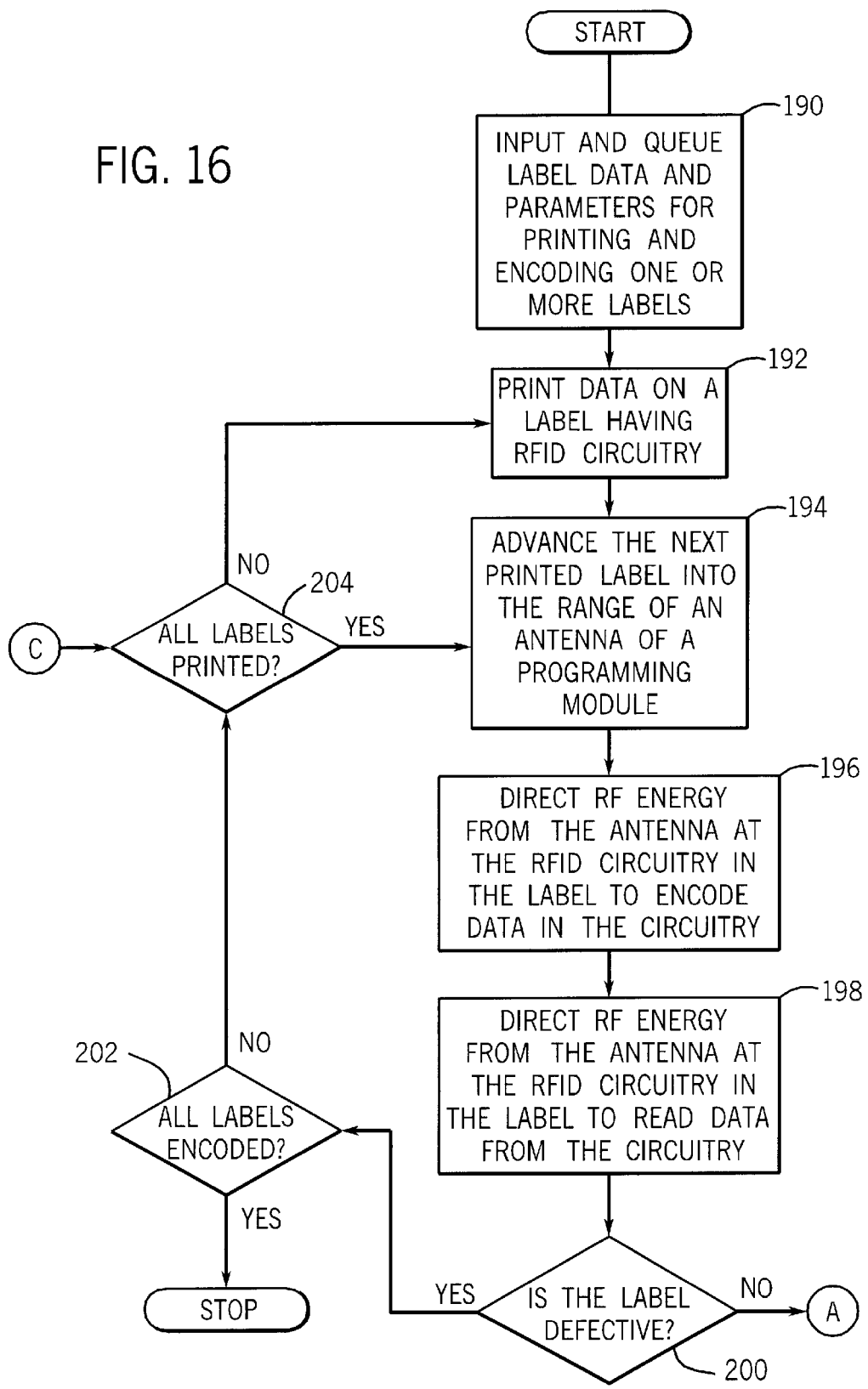

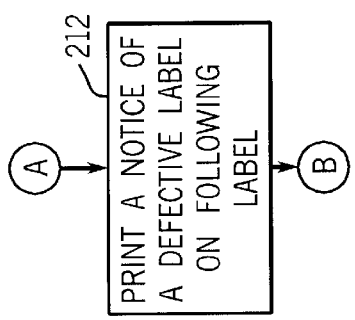
FIG. 21
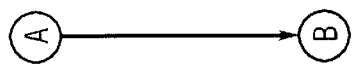
FIG. 20
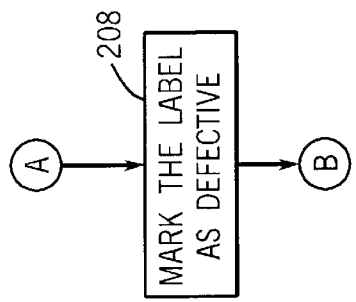
FIG. 19
FIG. 18
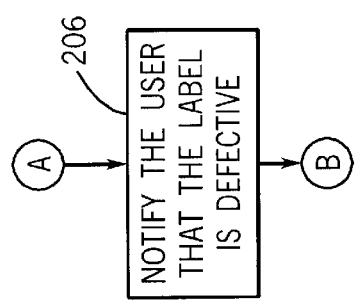
FIG. 17
FIG. 25
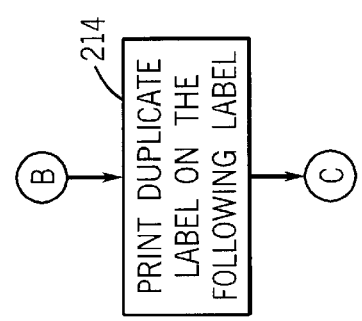
FIG. 23
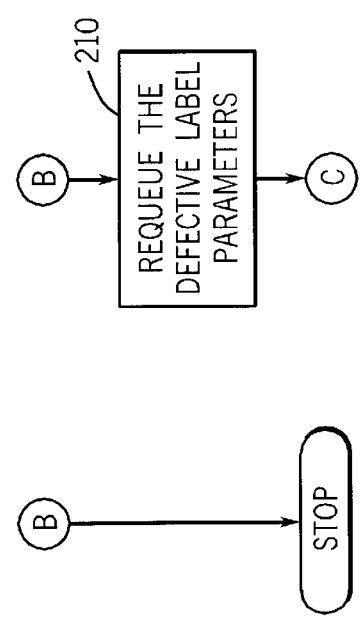
FIG. 22
FIG. 24

RFID LABEL PRINTING SYSTEM

CROSS REFERENCES TO RELATED APPLICATIONS

Not Applicable

STATEMENT REGARDING FEDERALLY SPONSORED RESEARCH

Not Applicable

BACKGROUND OF THE INVENTION

The field of invention is printing systems, more particularly to a printing system for printing on, and encoding, a radio frequency identification (RFID) label.

RFID devices are known in the art, such as disclosed in U.S. Pat. No. 5,347,263, which is fully incorporated herein by reference. These devices are, for example, used in systems for access control, animal feeding and health programs, inventory control, process control, and security applications.

A typical RFID system has a passive transponder having circuitry therein and a RFID reader/writer. A RFID reader/writer energizes the transponder circuitry by transmitting a power signal. The power signal may convey data which can be stored in a transponder memory or the transponder circuitry may transmit a response signal containing data previously stored in its memory. If the transponder circuitry transmits a response signal, the RFID reader/writer receives the response signal and interprets the data contained therein. The data is then transmitted to a host computer for processing.

As the cost and size of transponders decrease, their use is becoming more widespread. One known use for the transponders is to incorporate the transponder into printable media to produce a label. These labels can be printed with indicia which is machine readable, such as a bar code label, or human readable, such as words. The bar code or other indicia is printed on the label using conventional methods known in the art, such as a thermal transfer printer.

One known printer includes an internal RFID encoder which programs a label, and then prints on it. Printing on the label after encoding can damage the RFID circuitry rendering the RFID capability of the label inoperative. Damage to the RFID capability caused by the printer cannot be easily determined by a user. Furthermore, the user cannot determine whether the encoding was successful.

Another known printer having an internal RFID encoder programs the labels after the printing operation. However, as in the above printer, once the label is expelled from the printer, a user cannot tell whether the programming step was successful.

Providing a printer having an internal RFID encoder limits the flexibility of RFID label production. Printers without an encoding capability are useless when an RFID capable label is desired. Furthermore, currently available printers having internal encoders are expensive, and limit the size of the labels which can be printed and encoded. As a result, certain label sizes which can be printed using a non-RFID capable printer cannot be easily encoded to provide the desired RFID capability.

BRIEF SUMMARY OF THE INVENTION

The present invention provides a RFID label printing system which includes a printer for printing on a label having RFID circuitry. The printer includes a label exit for expelling a printed label, and an external programming module disposed adjacent the label exit for encoding the label expelled from the label exit. The external programming module can include a label marking mechanism which selectively marks a label to indicate a defective label to a user. A host computer communicatively connected to the printer and the external programming module coordinates the operation of the printer and the external programming module.

A general objective of the present invention is to provide a RFID label printing system which can incorporate a conventional printer. This objective is accomplished by providing an external programming module which can encode a RFID label after being expelled from the printer.

Another objective of the present invention is to provide a mechanism for indicating to a user whether a RFID label is defective. This objective is accomplished by providing a label marking mechanism which can mark a label which is determined by the printing system to be defective.

Yet another objective of the present invention is to provide a printing system which detects a defective label, and then notifies the user. This objective is accomplished by providing a printing system which attempts to read the encoded label, and if the read is unsuccessful, notifies the user.

The foregoing and other objects and advantages of the invention will appear from the following description. In the description, reference is made to the accompanying drawings which form a part hereof, and in which there is shown by way of illustration a preferred embodiment of the invention.

BRIEF DESCRIPTION OF THE DRAWINGS

FIG. 2A is a sectional front view of the encoder of FIG. 1;

FIG. 2B is a cross sectional view along line 2B—2B of FIG. 2A;

FIG. 7 is a perspective view of the punch mechanism in the label marking mechanism of FIG. 1;

FIG. 8 is a side view of the punch mechanism of FIG. 7;

FIGS. 16–25 are flowcharts of the operation of the printing system of FIG. 1.

DETAILED DESCRIPTION OF THE PREFERRED EMBODIMENTS

Figure 1:
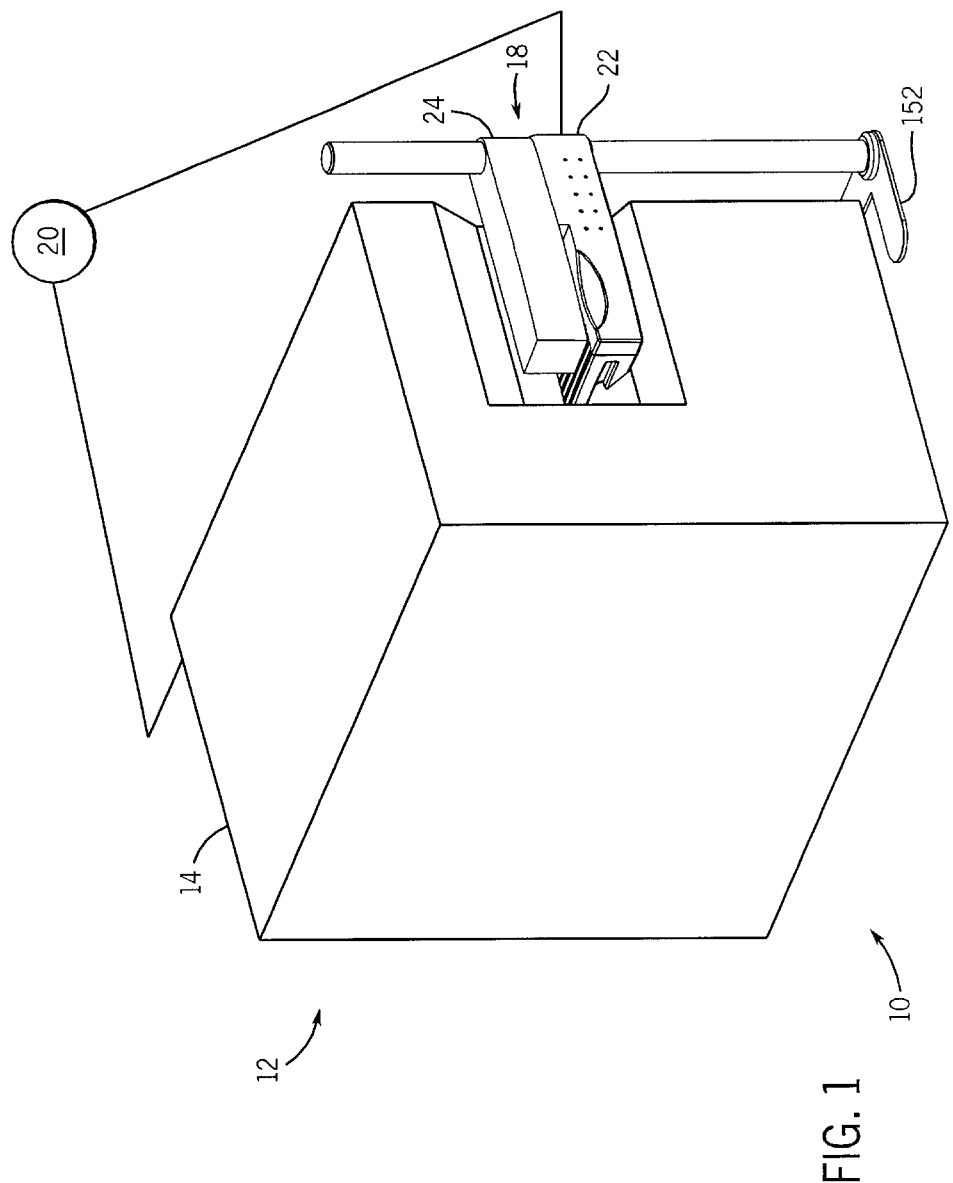
FIG. 1 is a perspective view of a printing system incorporating the present invention.
Figure 2:
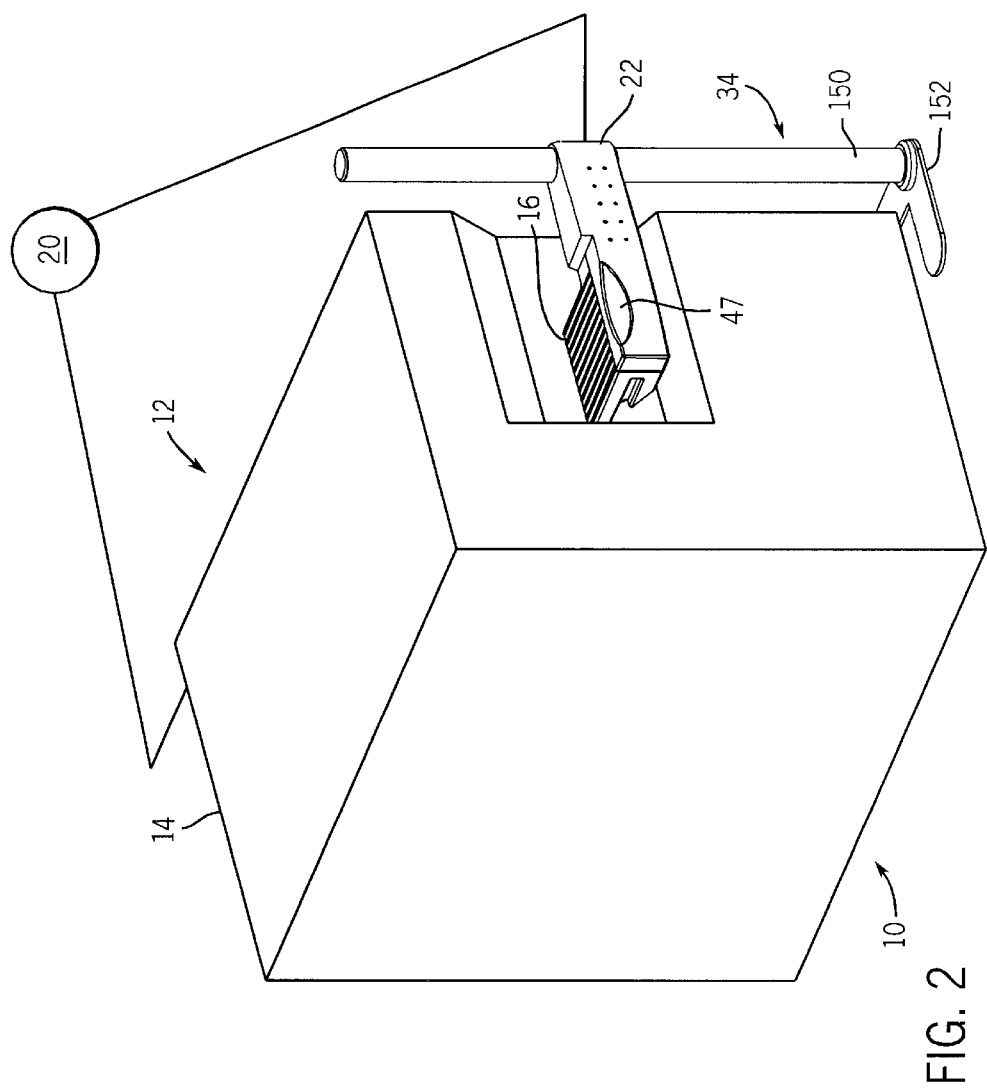
FIG. 2 is a perspective view of the printing system of FIG. 1 with the label marking mechanism removed.

Referring to FIGS. 1 and 2, a radio frequency identification (RFID) printing system 10 includes a conventional printer 12, such as a thermal transfer printer, having a housing 14 with an exit slot 16 through which is expelled a printed label (not shown). The label includes RFID circuitry, and passes an external programming module (EPM) 18 adjacent the printer exit slot 16. The EPM 18 encodes the label, and can mark a label which is not successfully encoded. A host computer 20, communicatively connected to the EPM 18 and printer 12, coordinates the operation of the EPM 18 and printer 12, and transmits data to the EPM 18 for encoding on the label RFID circuitry.

The printer 12 can be any conventional printer capable of interacting with a host computer, and forming an image on a label having RFID circuitry. For example, one exemplary printer is a thermal transfer printer, Model No. 200M, available from Brady Worldwide, Inc., Milwaukee, Wis.

Figure 6:
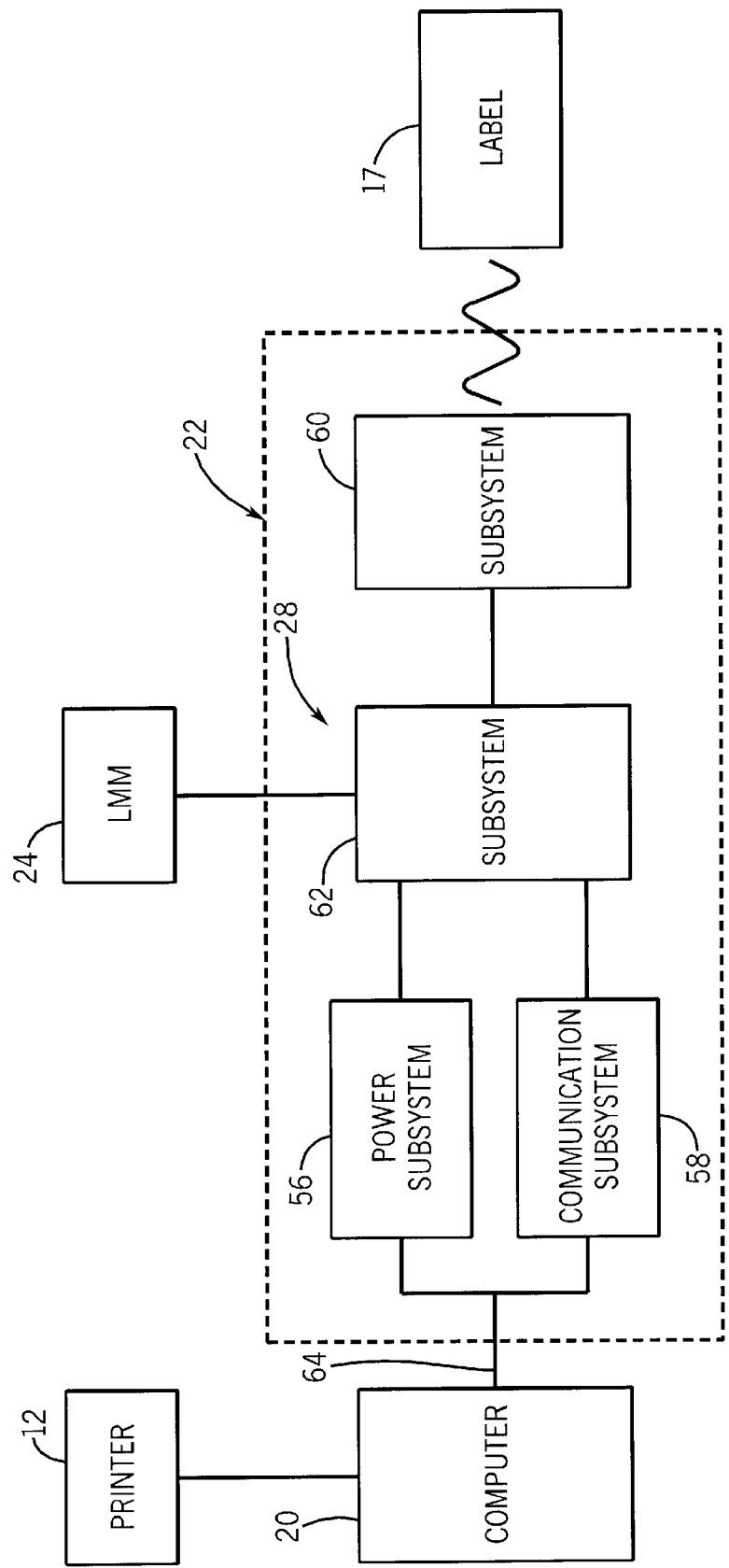
FIG. 6 is a block diagram of the printing system of FIG. 1.
Figure 9:
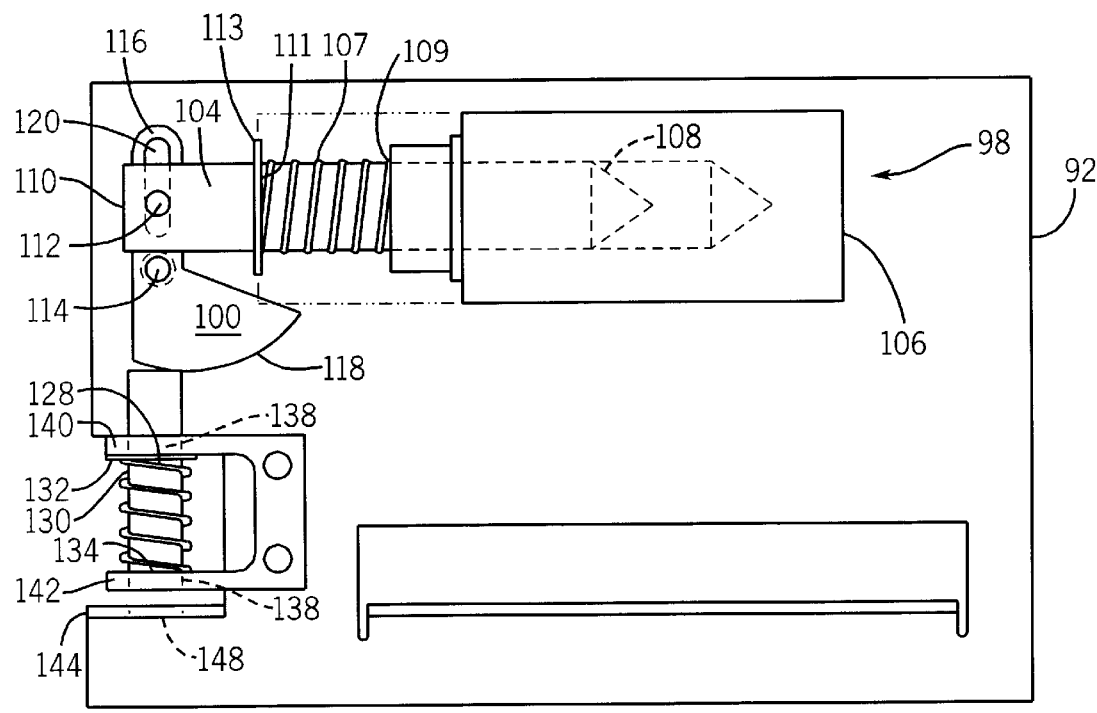
FIG. 9 is a front view of the punch mechanism of FIG. 7.
Figure 10:
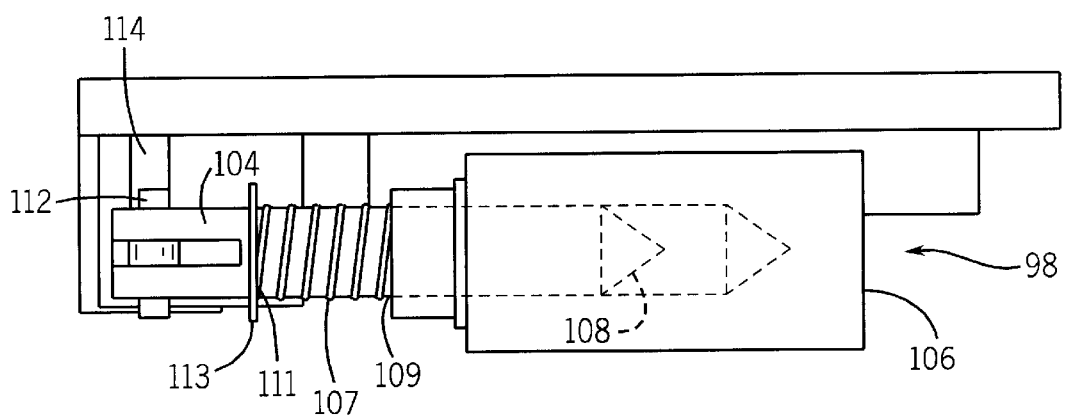
FIG. 10 is a top view of the punch mechanism of FIG. 7.

The label 17, shown in FIG. 6, is any printable media having RFID circuitry. For example, the label can be RFID circuitry, such as available from Texas Instruments, Inc., Dallas, Tex., laminated between layers of paper or plastic. Preferably, a plurality of the labels are releasably attached to a web to provide a series of adjacent printable RFID labels.

The RFID circuitry in the label stores information which can be specific to the label, such as a unique identifier, product information, price or the like. The information can then be downloaded from the label when needed using a compatible, conventional RFID reader (not shown). The RFID circuitry does not require a battery or external energy source other than RF energy received from the EPM 18. Once the circuitry is energized by RF energy, it can be encoded with data, such as from the EPM 18, or transmit encoded data, such as to the EPM 18 or the conventional RFID reader.

The EPM 18 encodes data in the label RFID circuitry, reads encoded data from the circuitry, and selectively marks a defective label. As shown in FIGS. 1–4, when in use, the EPM 18 is disposed adjacent the printer exit slot 16, and includes a RFID encoder 22 and a label marking mechanism (LMM) 24. EPM circuitry 28 disposed in the encoder 22 interacts with the label RFID circuitry through the antenna 26, and with a host computer 20.

The encoder 22 encodes the RFID circuitry in the label, and can read the encoded data from the label if the label is encoded successfully. The encoder 22 includes a housing 30 which encloses an antenna 26 electrically connected to the EPM circuitry 28 on a circuit board 29. The housing 30 is slidably mounted on a vertical stand 34 adjacent the printer exit slot. A clamping mechanism 156 (shown in FIGS. 11 and 12) engages the vertical stand 34 beneath the housing 30 to support the EPM 18 at a desired height.

Referring to FIGS. 1–4, the encoder housing 30 is formed from a nonconductive material, such as plastic, so as not to interfere with the RF energy generated by the antenna 26. The housing 30 is formed from two halves 35, 37 joined using methods known in the art, such as screws 39 threadably inserted into screw bosses 41, or the like.

When the housing halves 35, 37 are joined, the housing 30 has a bottom 38 joined to a top 36 by a front 40, back 42, and two ends 44. The top 36 defines an encoding surface 32 over which a label passes for encoding. A step 46 formed in the housing top 36 proximal one housing end 44 defines an edge of the encoding surface 32, and guides the label over the surface 32. The top front edge 47 of the housing 30 (best seen in FIG. 2A) is scalloped to provide the user with easy access to the encoded label. Preferably, the top 36 has a lip 46 which extends toward the printer exit slot 16, and the encoding surface 32 is a surface of the lip 46. A cylindrical opening 48 extending from the housing top 36 to the bottom 38 is formed at one housing end 44 to engage the vertical stand 34.

Figure 4:
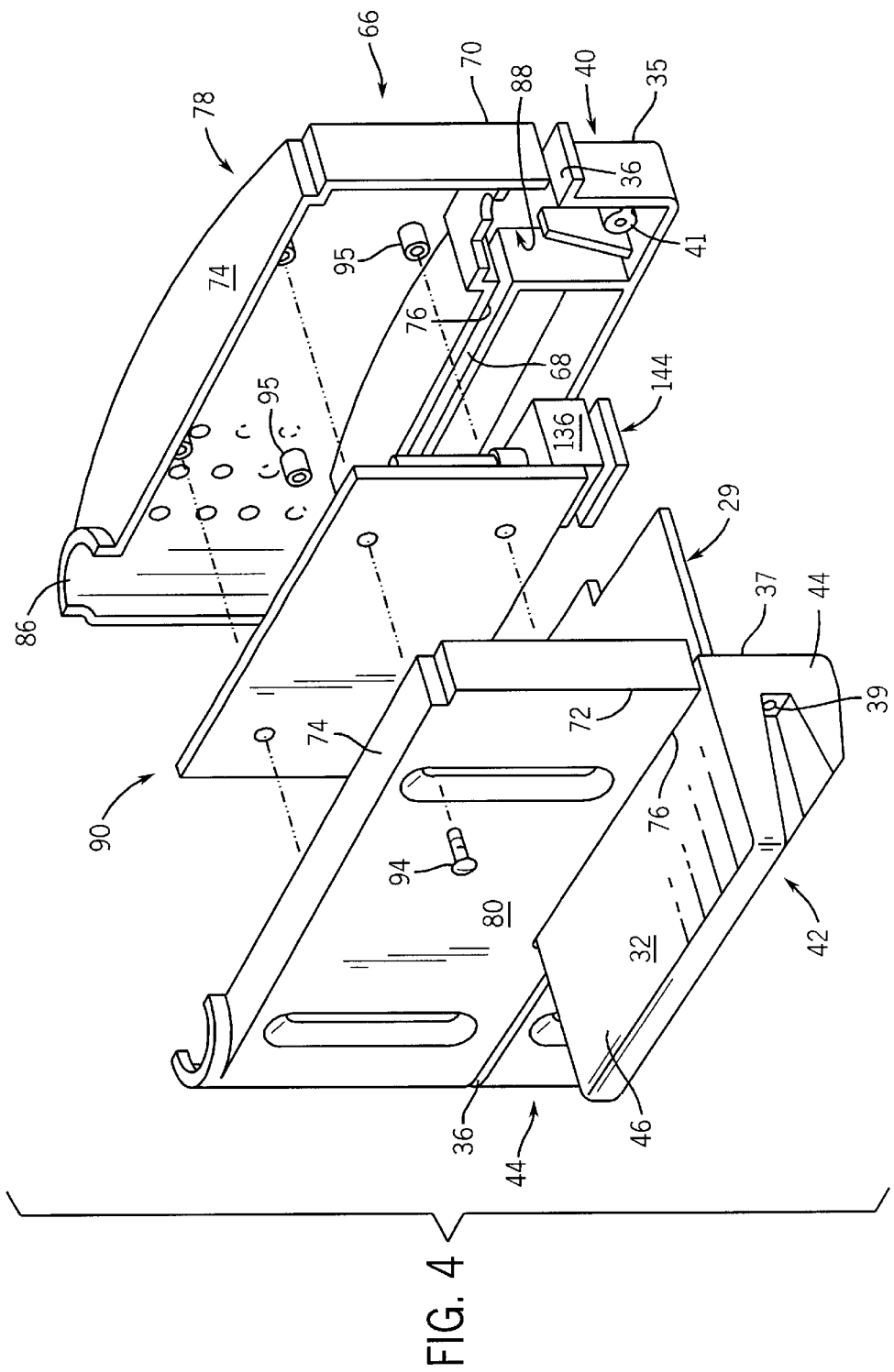
FIG. 4 is an exploded perspective view of the external programming module of FIG. 1.
Figure 5:
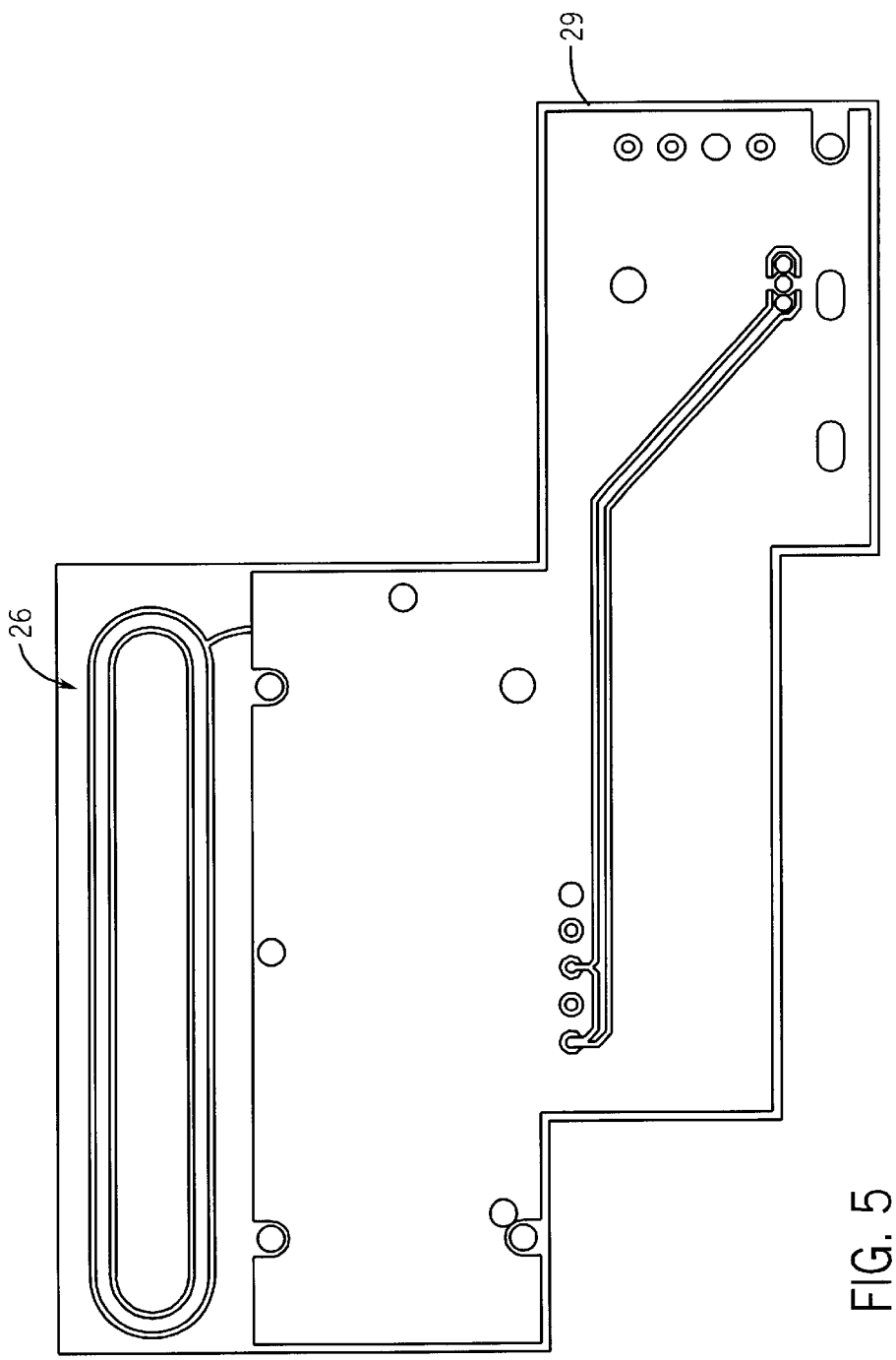
FIG. 5 is a top view of the printed circuit board of the encoder of FIG. 1.
Figure 5A:
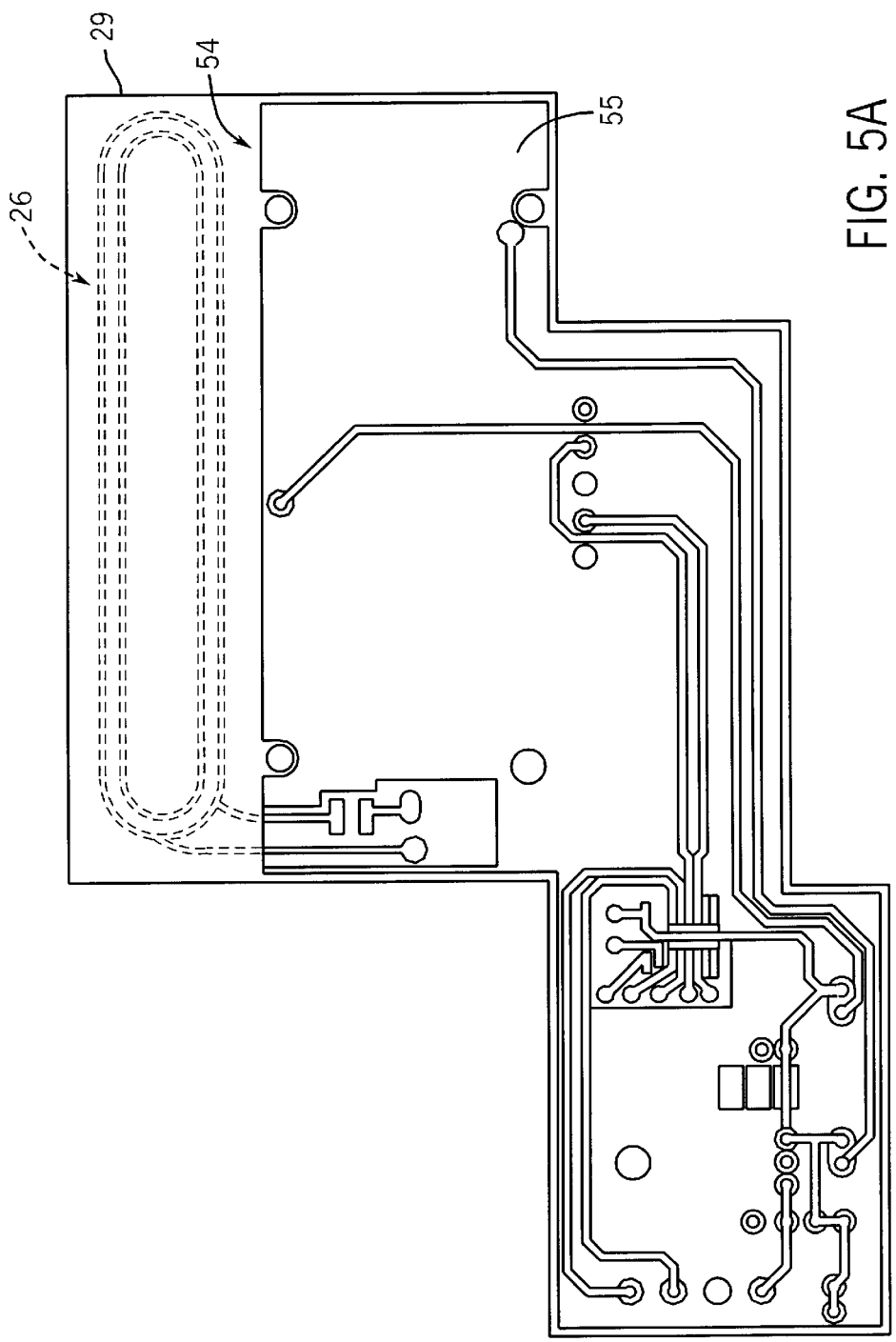
FIG. 5A is a bottom view of the printed circuit board of the encoder of FIG. 1.

Referring to FIGS. 2B, 4, 5A, the antenna 26 is mounted to the circuit board 29 in the housing 30 beneath the encoding surface 32, and is electrically connected to the EPM circuitry 28 for transmitting power signals to, and receiving data from, the label passing over the surface 32. Preferably, the antenna 26 is an air or ferrite core antenna having a diameter small compared to the size of the RFID circuitry in the label to avoid inadvertently energizing a label adjacent the label being encoded. Most preferably, the antenna 26 includes a ferrite core to concentrate the magnetic field for encoding the desired label.

As shown in FIGS. 3–5A, the RF energy from the antenna 26 can be focused through the encoding surface 32 to avoid energizing adjacent labels by shielding the adjacent labels using a shield 54 to direct the antenna magnetic field. The shield 54 is formed from a conductive material, such as copper, or a magnetic material, such as a ferrous material, and is positioned adjacent the encoding surface 32. Preferably, the shield 54 is positioned beneath adjacent labels, such as an encoded label advanced past the encoding surface 32, to direct the magnetic field through the label being encoded and away from the adjacent label. Most preferably, the printer adjacent the EPM shields the labels prior to encoding.

The shield 54 can be mounted directly to the housing, or as shown in FIG. 5A, to a portion of the circuit board 29 not directly below the encoding surface 32. Although one shield is disclosed, one or more shields can be provided without departing from the scope of the present invention. Preferably, as shown in FIG. 5A, a conductive mesh 55 formed on the circuit board 29 approximates the effect of a sheet of conductive material with a ground plane within the board circuitry.

Referring to FIGS. 2–4, and 6, the circuit board 29 is mounted in the housing 30 using methods known in the art, such as screws (not shown) threadably inserted into screw bosses (not shown), or the like. As shown in FIG. 6, the circuitry 28 is composed of four main subsystems; a power subsystem 56 for regulating power within the EPM circuitry 28; a communications subsystem 58 for serially communicating with the host computer 20; a radio frequency subsystem 60 for translating digital signals from a microcontroller subsystem 62 into RF signals which are transmitted to the label and vice versa; and the microcontroller subsystem 62 for controlling the first three subsystems 56, 58, 60, and the LMM 24. Although one circuit board 29 is disclosed, the EPM circuitry 28 can be contained on one or more circuit boards without departing from the scope of the present invention.

The power subsystem 56 receives power from an external power source (not shown), such as a battery, constant voltage power supply, or the like, and regulates the power for the EPM circuitry 28. The communications subsystem 58 is electrically connected by the cable 64 to the host computer 20 for serial communication with the host computer 20. The RF subsystem 60 translates digital signals from the microcontroller subsystem 62 into a RF signal which is then transmitted to the label through the antenna 26. RF signals received through the antenna 26 are translated by the RF subsystem 60 into digital signals which are sent to the microcontroller subsystem 62.

The EPM circuitry 28 performs other functions in addition to the functions performed by the four main subsystems 56, 58, 60, 62. Light emitting diodes (LEDS) 63 mounted on the front of the encoder are energized by the EPM circuitry 28 to inform the user of the current state of the EPM. Referring to FIG. 2A, the EPM circuitry 28 energizes one LED 63 to indicate the EPM is turned on, a second LED 63 to indicate the encoder is encoding or reading RFID circuitry in a label; and a third LED to indicate the encoding operation was successful. Although three LEDS are disclosed, any number or type of light sources can be used without departing from the scope of the present invention.

As shown in FIGS. 1–4, the LMM 24 is disposed adjacent to the encoder 22 to physically mark a label which is not successfully encoded. Preferably, the LMM 24 is supported by the encoder 22 mounted to the vertical stand 34. As shown in FIG. 2, the LMM 24 can be separable from the encoder 22, and not required for the operation of the EPM 18. The LMM 24 includes a physical marking mechanism enclosed in a LMM housing 66. Although a separable LMM 24 is disclosed, in certain applications, it may be preferable to integrate the LMM 24 and encoder 22 to provide an inseparable unit. Of course, providing an inseparable LMM 24 and encoder 22 does not depart from the scope of the invention.

The LMM housing 66 extends over the encoder top 36 to cooperatively define a slot 68 in the EPM 18 to guide the labels over the encoding surface 32. Advantageously, the slot 68 has an open end which allows the slot 68 to accommodate any size label from the printer 12. Thus, the present invention does not limit the size of the RFID label as in the prior art. The elongated housing 66 is formed from a nonconductive material, such as plastic, so as not to interfere with the RF energy generated by the antenna 26, and is slidably mounted on the vertical stand 34.

Figure 3:
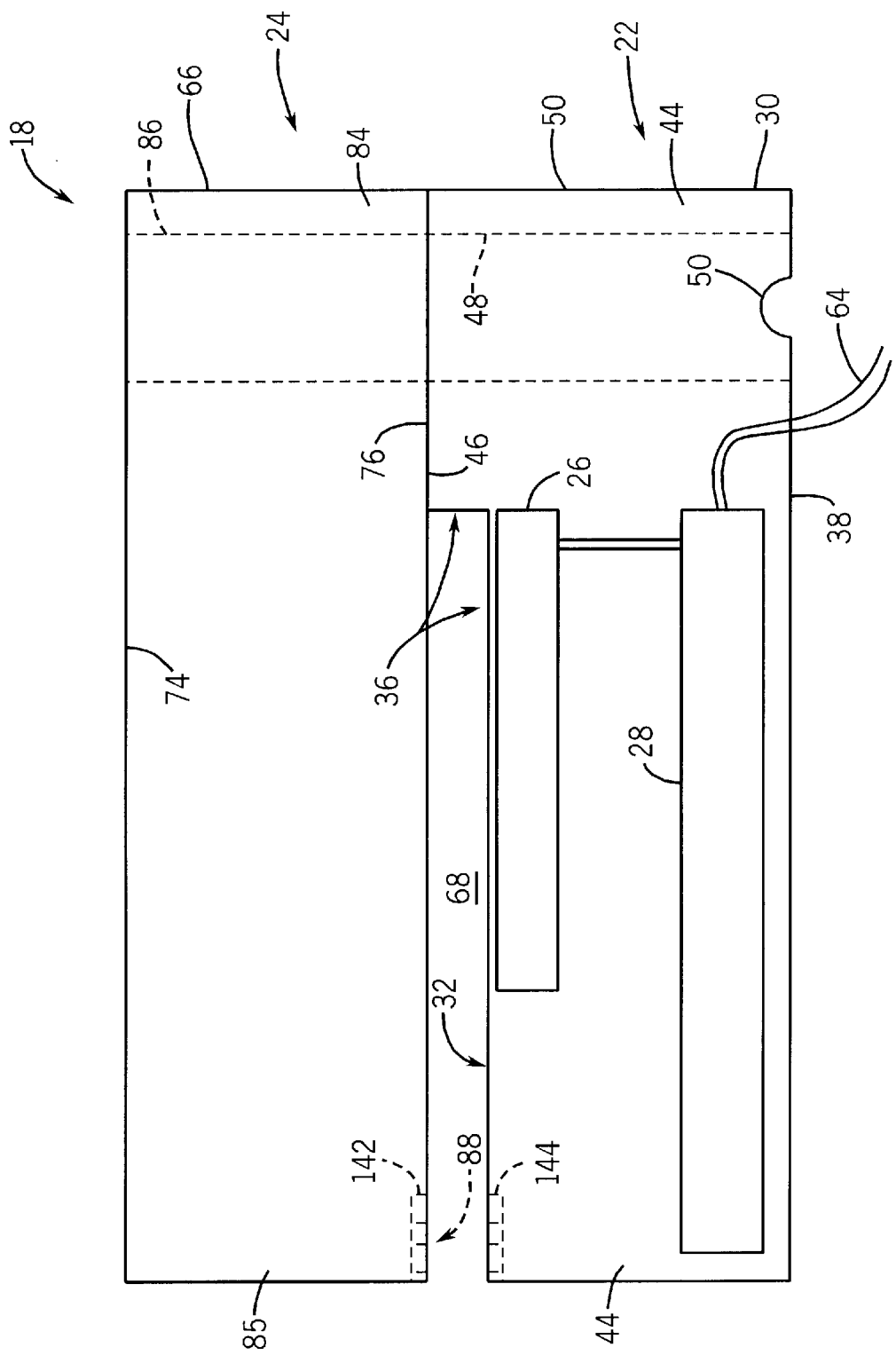
FIG. 3 is a schematic view of the external programming module of FIG. 1.

Looking particularly at FIGS. 3 and 4, the LMM housing 66 is formed from a front and rear halves 70, 72, and has a top 74 and a bottom 76 joined to the top 74 by a front 78, back 80, and two ends 84, 85. The halves 70, 72 are joined using methods known in the art, such as screws 94 threadably inserted into screw bosses 95, or the like. A cylindrical opening 86 extending from the LMM housing top 74 to the bottom 76 coaxial with the encoder cylindrical opening 48 is formed in the LMM housing 66 to engage the vertical stand 34 (shown in FIGS. 1 and 2). A portion of the housing bottom 76 proximal the cylindrical opening 86 engages the encoder housing step 46 to support the LMM housing 66 over the encoding surface 32. The physical marking mechanism engages a defective label through an opening 88 in the LMM housing bottom 76.

In the embodiment shown in FIGS. 4, 6–10, the physical marking mechanism is a punch mechanism 90 which physically deforms the defective label by punching a hole through printable media. The physical deformation provides a mark which designates to a user that the label is defective. Although a physical marking mechanism which destructs a portion of the label is disclosed, other methods of visibly designating a defective label may be used without departing from the scope of the present invention. For example, the physical marking mechanism can include components which merely spray a visible ink on the label to indicate to a user that the label is defective. Other methods of physically deforming the label may also be used, such as cutting, or creasing the label, without departing from the scope of the present invention.

The punch mechanism 90 is mounted on a base 92, and controlled by the EPM circuitry 28. Referring particularly to FIGS. 4, 6–10, the base 92 is mounted to the LMM housing 66 by screws 94 which also join the housing halves 70, 72 together. The punch mechanism 90 includes a cam-operated punch 96 which is actuated by a solenoid 98 electrically connected to the EPM circuitry 28. When energized by the EPM circuitry 28, the solenoid 98 pivots a pivotally mounted cam 100 to urge the punch 96 through a defective label.

The solenoid 98 is mounted to the base 92 by a bracket 102, and has a plunger 104 which retracts axially into a solenoid coil housing 106 when the solenoid is energized. The plunger 104 includes an inner end 108 disposed in the housing 106, and an outer end 110 pivotally and slidably connected to the cam 100 by a pin 112. A spring 107 wrapped around the plunger 104 has one end 109 acting on the solenoid coil housing 106, and a second end 111 acting on an e-ring 113 clipped to the plunger 104. The spring 107 urges the plunger 104 out of the solenoid coil housing 106 when the solenoid 98 is deenergized.

The cam 100 is pivotally mounted to the base 92 with a cam shaft 114, and urges the punch 96 through a defective label when the solenoid 98 is energized. The cam 100 includes an upper end 116 connected to the plunger outer end 110, and a camming surface 118. The upper end 116 has a vertical slot 120 formed therein, and the pin 112 extends through the slot 120 to connect the cam 100 to the plunger 104. The pin 112 pivots and slides in the slot 120 to rotate the camming surface 118 about the cam shaft 114. The camming surface 118 is an arcuate surface slidably engaged with an upper end 122 of the punch 96 for urging the punch 96 through the defective label.

The punch 96 has a cylindrical body 124 with the upper end 122 engaging the camming surface 118, and an opposing punch end 126 formed for punching a hole in the defective label. Preferably, the punch end 126 has a notch formed therein with sharpened edges to efficiently punch a hole in the defective label. Most preferably, the punch 96 is spring biased away from the label by a spring 128 to retract the punch 96 when the solenoid 98 is deactivated. The spring 128 has one end 130 acting against an e-ring 132 attached to the punch 96, and an opposing end 134 acting against a guide bracket 136 to urge the punch 96 away from the defective label.

The guide bracket 136 is mounted to the base 92, and has guide fingers 140, 142 which guide the punch 96 toward the defective label. The upper and lower guide fingers 140, 142 include aligned apertures 138 for guiding the cylindrical punch 96.

A back support 144 mounted to the encoder housing 30, and disposed below the lower guide finger 142 has an upper surface 146 which is substantially coplanar with the encoder encoding surface 32. When a label passes over the encoding surface 32, a portion of the label passes between the lower guide finger 142 and the back support upper surface 146. The back support supports the label portion when the punch 96 is punching therethrough. An aperture 148 formed in the back support 144 is aligned with the guide finger apertures 138, and receives the punch 96 to ensure that it passes through the label when the solenoid 98 is energized.

Referring back to FIGS. 1–3, the EPM 18 is slidably mounted on the vertical stand 34 adjacent the printer 12. The stand 34 includes a vertical cylindrical post 150 supported by feet 152. The post 150 extends through the cylindrical openings 48, 86 in the EPM 18 to position the EPM 18 adjacent to the printer exit slot 16. The supporting surface engaging feet 152 extend radially from the post 150. Preferably, the post 150 is a hollow extrusion having a longitudinal slot 154, such as shown in FIGS. 11–13, for receiving a clamping mechanism.

Figure 11:
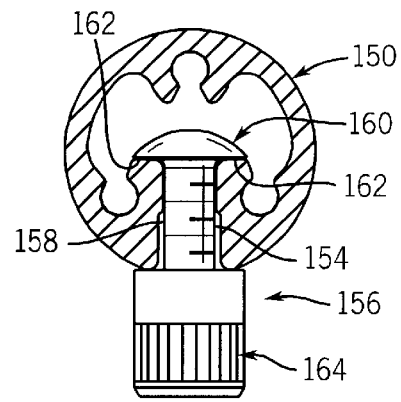
FIG. 11 is a sectional view of the post of FIG. 1 showing the clamping mechanism.
Figure 12:
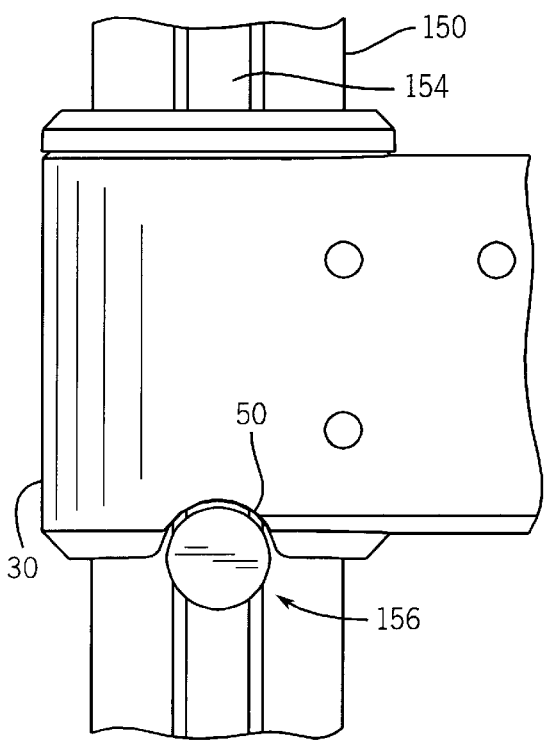
FIG. 12 is a front view of the clamping mechanism of FIG. 1.
Figure 13:
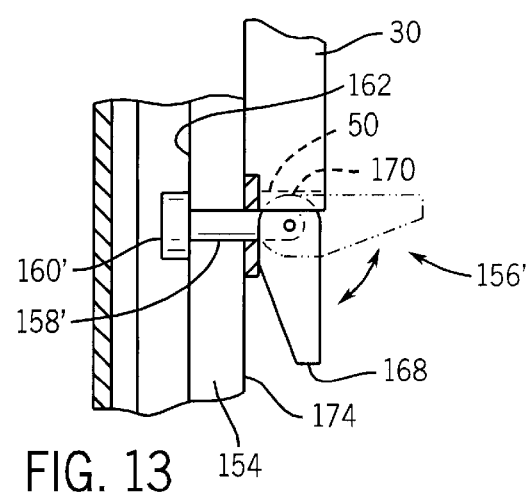
FIG. 13 is an alternative clamping mechanism.

As shown in FIGS. 11 and 12, the clamping mechanism is a clamping bolt 156 nested in the groove 50 formed in the encoder housing 30. The bolt 156 engages the post 150 to clamp the EPM 18 at a desired height. The clamping bolt 156 has a threaded body 158 extending through the post slot 154, and a head 160 disposed inside the post 150 engaging a post interior surface 162. Rotating a textured nut 164 threadably engaging the bolt body 158 tightens the head 160 against the post interior surface 162 to clamp the EPM 18 at the desired height on the post 150.

Other clamping mechanisms, such as a cam operated clamping bolt can be used without departing from the scope of the present invention. For example, as shown in FIG. 13, an alternative clamping bolt 156' includes a body 158' extending though the groove 50 and post slot 154, and a head 160' engaging the post interior surface 162. A cam lever 168 has an arcuate camming surface 170 which engages a spacer nut 172 interposed between the camming surface 170 and the post exterior surface 174. Moving the lever 168 from an unlock position (shown in dashed lines) to a lock position tightens the clamping bolt head 160' against the post interior surface 162 to hold the EPM 18 in place on the post 150.

Figure 14:
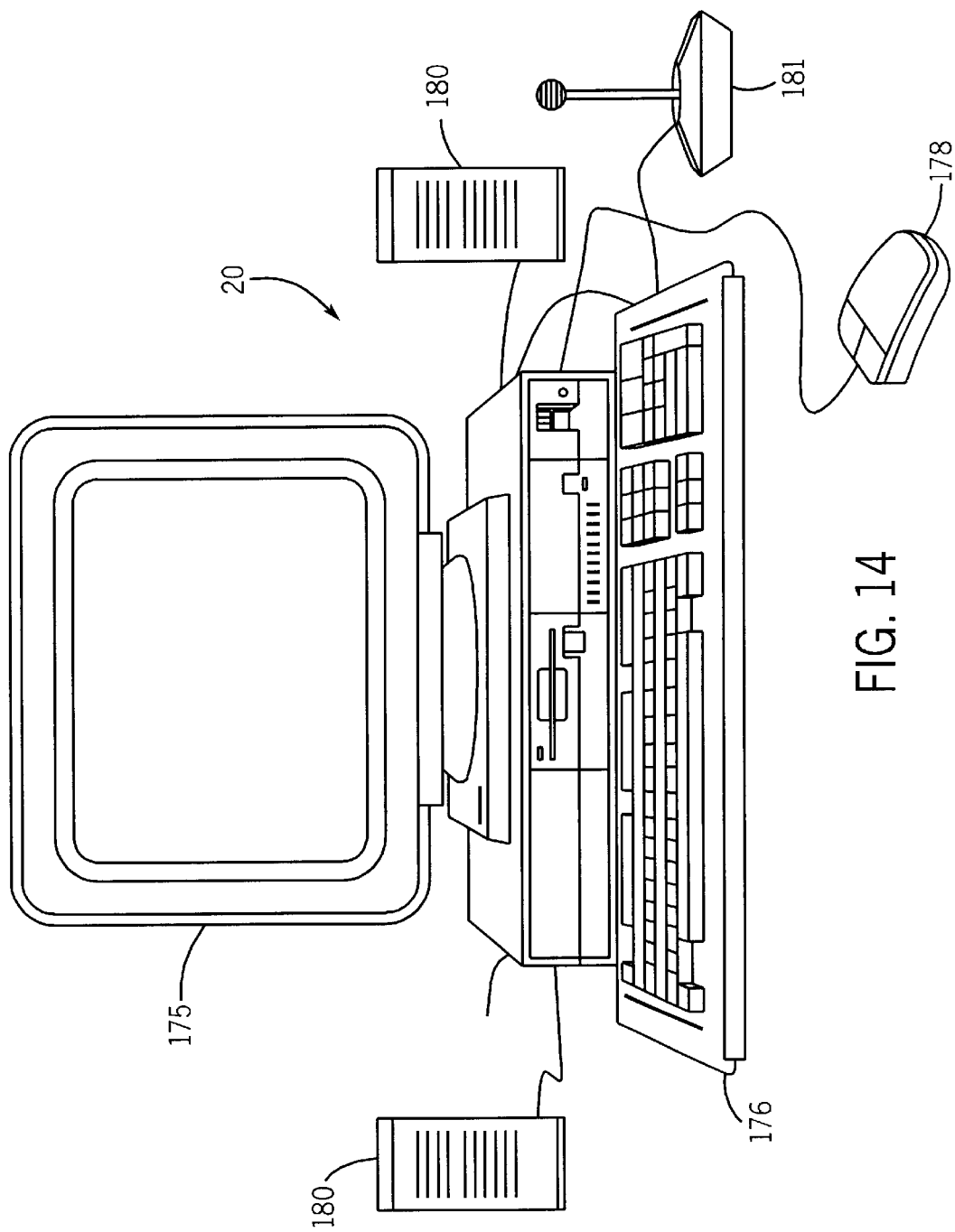
FIG. 14 is a perspective of a host computer for use in the printing system of FIG. 1.

The printer 12 and EPM 18 (shown in FIGS. 1 and 2) are controlled by a computer system comprising the host computer 20, such as shown in FIG. 14. As shown in FIG. 6, the host computer 20 is communicatively connected to the printer 12 and the EPM 18, and has software which integrates the operation of the printer 12 and the EPM circuitry 28 in the EPM 18 to produce a printed RFID label. Preferably, as shown in FIG. 14, the host computer 20 includes a central processing unit (CPU) having one or more memory devices and associated.circuitry, a monitor 175, and an interface device, such as a keyboard 176. The host computer 20 also includes a computer memory device, which is preferably comprised of an electronic random access memory and a removable or fixed bulk data storage medium, such as a magnetic disk drive or diskette, for storing the software thereon.

The CPU can be comprised of any suitable microprocessor or other electronic processing unit, as is well known to those skilled in the art. An example of such a CPU would include the Pentium III brand microprocessor available from Intel Corporation or any similar microprocessor. Other periphery devices, shown in FIG. 14, such as a mouse 178, speakers 180, and microphone 181 can also be provided with the system, but are not necessary for operation of the invention as described herein. The various hardware requirements for the computer system as described herein can generally be satisfied by any one of many commercially available high speed multimedia personal computers offered by manufacturers such as International Business Machines Corporation (IBM), Compaq, Hewlett Packard, or Apple Computers.

Figure 15:
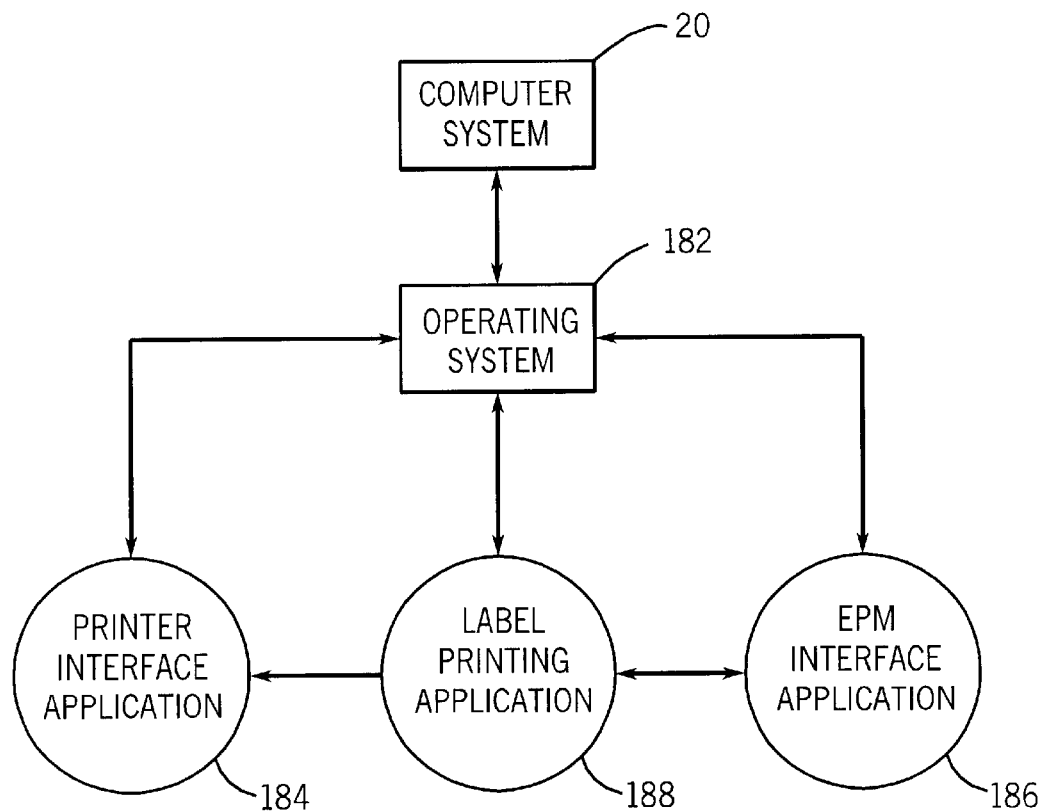
FIG. 15 is an application architecture in the host computer of FIG. 14 for a printing system incorporating the present invention.

FIG. 15 illustrates a typical software architecture for a RFID label printing system in the host computer 20. The system software includes an operating system 182, a printer interface application 184, an EPM interface application 186, and a label printing application 188. The label printing application 188 operates on the host computer, receives input for printing a label, and coordinates the operation of the printer and EPM through the interface applications 184, 186. In a preferred embodiment which shall be discussed herein, operating system 182 is one of the Windows family of operating systems, such as Windows NT, Windows 95 or Windows 98 which are available from Microsoft Corporation of Redmond, Wash. However, the system is not limited in this regard, and the invention can also be used with any other type of computer operating system. The system as disclosed herein can be implemented by a programmer, using commercially available development tools for the operating systems described above. Although, the applications 184, 186, 188 are shown as separate modules, the functions of each module can be integrated into one or more applications.

As shown in FIG. 16, in operation, a user interacts with the software in step 190 to input label parameters, such as data for printing and/or encoding one or more labels. Preferably, the label parameters are placed in a queue for sequentially producing a series of encoded printed labels. In step 192, the software initiates printing each label by the printer which expels the printed label out of the printer exit, and over the EPM encoding surface in step 194. Once the label is indexed over the encoding surface, in step 196 the software initiates encoding the label with the data determined by the user.

The encoding process includes directing RF energy in a power signal transmitted through the antenna 26 (shown in FIG. 3) toward the label. The RFID circuitry in the label is activated by the RF energy, and transmits a signal indicating the RFID circuitry is ready for encoding. Once the antenna 26 receives the transmitted signal from the RFID circuitry, the EPM circuitry 28 (shown in FIG. 3) proceeds to include data in the power signal to encode in the RFID circuitry.

Once the encoding process is complete, in step 198 the software attempts to read the encoded data on the label through the EPM. If the label cannot be read, the label is deemed defective. In order to increase the throughput speed of the EPM, step 198 can be skipped, and the label can be deemed defective if the RFID circuitry does not transmit a signal after initially receiving RFID energy from the antenna.

If the label is not deemed defective in step 200, in step 202 the software determines whether there are more labels to encode, and in step 204 the software determines if there are more labels to print. If all labels are completed the software stops. If additional labels require encoding, the encoded label is indexed forward passing the encoded label out of the range of the antenna, and an unencoded label is slipped over the EPM encoding surface for encoding.

If the label is deemed defective in step 200, the software can initiate one or more of the following actions: the software can notify the user of the defective label, as in FIG. 17, step 206; the software can log the defective label in a log file as in FIG. 18, step 207; the software can actuate the LMM to physically mark the defective label as in FIG. 19, step 208, the software can ignore the defective label as in FIG. 20; or the software can print a notice on the next label notifying the user that the previous label is defective, as in FIG. 21, step 212.

Once the desired action is taken to indicate a defective label, the software can add the defective label parameters into the queue to reprint and reencode a duplicate label as in FIG. 22, step 210; the software can immediately print a duplicate label following the defective label as in FIG. 23, step 214; the software can stop the printer action, as in FIG. 24, to require user intervention; or the software can continue printing the remaining labels as in FIG. 25.

While there has been shown and described what are at present considered the preferred embodiment of the invention, it will be obvious to those skilled in the art that various changes and modifications can be made therein without departing from the scope of the invention defined by the appended claims.

We claim:

1. A radio frequency identification device (RFID) label printing system comprising:

a printer including a label exit for expelling a printed label having RFID circuitry;

an external programming module disposed adjacent said label exit for encoding the label expelled from said label exit, said programming module including an antenna disposed adjacent an exit slot of said printer, and having a shield mounted adjacent said antenna for focusing a magnetic field generated by said antenna toward a label being encoded, wherein said shield is formed from material selected from a group consisting of conductive and magnetic materials; and a host computer communicatively connected to said printer and said external programming module for coordinating the operation of said printer and said external programming module.

2. The RFID label printing system of claim 1, in which said external programming module includes a label marking mechanism for selectively marking a label expelled from said label exit.

3. The RFID label printing system of claim 2, in which said label marking mechanism selectively marks the expelled label by physically deforming the label.

4. The RFID label printing system of claim 1, in which said external programming module is powered by an external power source.

5. The RFID label printing system of claim 1, including mounting hardware for positioning said external programming module adjacent said label exit.

6. An external programming module for programming radio frequency identification device (RFID) labels exiting a printer slot, said module comprising:

an antenna;

circuitry electrically connected to said antenna for interacting with an RFID label, and communicatively connected to a host, wherein said host communicates data to said circuitry for encoding on a printed RFID label exiting said printer slot and passing said antenna; and a shield mounted adjacent said antenna for focusing a magnetic field generated by said antenna toward a label being encoded, wherein said shield is formed from a material selected from a group consisting of conductive and magnetic materials.

7. The external programming module of claim 6, including a label marking mechanism adjacent said antenna for selectively marking a label expelled from the printer.

8. The external programming module of claim 6, in which said label marking mechanism selectively marks a label by physical deforming said label.

9. The external programming module of claim 6, in which said circuitry is powered by an external source.

10. The external programming module of claim 6, including mounting hardware for positioning said antenna adjacent said exit slot.

11. A programming module for programming printed radio frequency identification device (RFID) labels, said module comprising:

an encoder for encoding a printed RFID label, said encoder including an antenna, and having a shield mounted adjacent said antenna for focusing a magnetic field generated by said antenna toward a label being encoded, wherein said shield is formed from material selected from a group consisting of conductive and magnetic materials;

means for determining whether said label is defective; and a label marking mechanism disposed adjacent said encoder for selectively marking the printed RFID label if said label is defective.

12. The programming module of claim 11, in which said label marking mechanism selectively marks a label by physically deforming said label.

13. The programming module of claim 11, in which said encoder includes:

an antenna disposed adjacent an exit slot of a printer;

circuitry electrically connected to said antenna for interacting with an RFID label, and communicatively connected to said host computer, wherein said host communicates data to said circuitry for encoding on a label exiting said printer slot and passing said antenna.

14. The programming module of claim 13, in which said circuitry is powered by an external power source.

15. The programming module of claim 11, including mounting structure for mounting said encoder and label marking mechanism adjacent a printer exit slot.

16. The programming module of claim 15, in which said encoder or said label marking mechanism is supported by said mounting structure, and the other of said encoder or said label marking mechanism is supported by said encoder or said label marking mechanism.

17. The programming module of claim 11, in which said label marking mechanism includes a punch mechanism which selectively punches a hole in a RFID label.

18. A method of providing a radio frequency identification device (RFID) label comprising the steps of:

printing on a label having RFID circuitry;

advancing said label into the range of an antenna of a programming module;

focusing radio frequency (RF) energy from said antenna toward said RFID circuitry using focusing means mounted adjacent the antenna to encode data in said RFID circuitry;

determining whether said label is defective; and selectively marking said label if said label is defective.

19. The method of claim 18, in which the step of determining whether the label is defective includes directing RF energy from said antenna at said RFID circuitry to cause said RFID circuitry to transmit said encoded data.

20. The method of claim 18, in which the step of selectively marking said label includes physically deforming said defective label.

21. The method of claim 18, further including the step of advancing said label out of the range of the antenna, and advancing another label into the range of the antenna.

22. The method of claim 18, in which the step of selectively marking said defective label includes notifying the user of a defective label.

23. The method of claim 18, in which the step of selectively marking said defective label includes updating a log file indicating the defective label.

24. The method of claim 18, in which the step of selectively marking said defective label includes reprinting and reencoding a duplicate label with indicia and data intended for said defective label.

25. In a computer system having a label printing application comprising:
- means for printing on a label having radio frequency identification device (RFID) circuitry;
- means for advancing said label into the range of an antenna of a programming module;
- means for focusing radio frequency (RF) energy from said antenna toward said RFID circuitry to encode data in said RFID circuitry;
- means for determining whether said label is defective; and
- means for selectively marking said label if said data is not transmitted by said RFID circuitry to indicate the label is defective.

26. The computer system of claim 25, in which the means for determining whether the label is defective includes means for directing RF energy from said antenna at said RFID circuitry to cause said RFID circuitry to transmit said encoded data.

27. The computer system of claim 25, in which the means for selectively marking said label includes means for physically deforming said defective label.

28. The computer system of claim 25, further including means for advancing said label out of the range of the antenna, and advancing another label into the range of the antenna.

29. The computer system of claim 25, in which the means for selectively marking said defective label includes notifying the user of a defective label.

30. The computer system of claim 25, in which the means for selectively marking said defective label includes updating a log file indicating the defective label.

31. The computer system of claim 25, in which the means for selectively marking said defective label includes reprinting and reencoding a duplicate label with indicia and data intended for said defective label.

32. A machine readable storage, having stored thereon a computer program having a plurality of code sections executable by a machine for causing the machine to perform the steps of:
- printing on a label having radio frequency identification device (RFID) circuitry;
- advancing said label into the range of an antenna of a programming module;
- focusing radio frequency (RF) energy from said antenna toward said RFID circuitry to encode data in said RFID circuitry;
- determining whether said label is defective; and
- selectively marking said label if said data is not transmitted by said RFID circuitry to indicate the label is defective.

33. The machine readable storage as claimed in claim 32, in which the step of determining whether the label is defective includes directing RF energy from said antenna at said RFID circuitry to cause said RFID circuitry to transmit said encoded data.

34. The machine readable storage as claimed in claim 32, in which the step of selectively marking said label includes physically deforming said defective label.

35. The machine readable storage as claimed in claim 32, including a plurality of code sections executable by a machine for causing the machine to perform the step of advancing said label out of the range of the antenna, and advancing another label into the range of the antenna.

36. The machine readable storage as claimed in claim 32, in which the step of selectively marking said defective label includes notifying the user of a defective label.

37. The machine readable storage as claimed in claim 32, in which the step of selectively marking said defective label includes updating a log file indicating the defective label.

38. The machine readable storage as claimed in claim 32, in which the step of selectively marking said defective label includes reprinting and reencoding a duplicate label with indicia and data intended for said defective label.

* * * * *